(12) United States Patent
Fan et al.

(10) Patent No.: US 7,319,890 B2
(45) Date of Patent: Jan. 15, 2008

(54) DETECTION METHOD AND FOLDABLE ELECTRONIC DEVICE THEREOF

(75) Inventors: Chen-Huang Fan, Miaoli (TW); Yueh-Hsiu Lee, Taipei (TW)

(73) Assignee: Benq Corporation, Taoyuan (TW)

( * ) Notice: Subject to any disclaimer, the term of this patent is extended or adjusted under 35 U.S.C. 154(b) by 462 days.

(21) Appl. No.: 11/001,703

(22) Filed: Nov. 30, 2004

(65) Prior Publication Data

US 2005/0141702 A1  Jun. 30, 2005

(30) Foreign Application Priority Data

Dec. 3, 2003  (TW) .............................. 92134001 A

(51) Int. Cl.
*H04M 1/00*  (2006.01)
(52) U.S. Cl. ............................... 455/575.3; 455/569.1; 455/567; 700/244

(58) Field of Classification Search ............. 455/575.3, 455/569.1, 567; 700/244
See application file for complete search history.

(56) References Cited

U.S. PATENT DOCUMENTS

| | | | |
|---|---|---|---|
| 6,115,620 A * | 9/2000 | Colonna et al. | 455/569.1 |
| 6,269,256 B1 * | 7/2001 | Nakamura | 455/567 |
| 2005/0043856 A1 * | 2/2005 | Bautista et al. | 700/244 |

* cited by examiner

*Primary Examiner*—Sand D. Phu
(74) *Attorney, Agent, or Firm*—Thomas, Kayden, Horstemeyer & Risley

(57) ABSTRACT

A foldable electronic device and a detection method. The detection method determines whether the foldable electronic device is in an open position or a closed position according to a detected sound wave received by a microphone of the foldable electronic device.

21 Claims, 4 Drawing Sheets

DETECTION METHOD AND FOLDABLE ELECTRONIC DEVICE THEREOF

BACKGROUND

The invention relates to an electronic device and detection method thereof, and more particularly to a foldable electronic device and a detection method that utilizes a specific sound wave to determine the position of the foldable electronic device.

Foldable mobile devices typically cove gained considerable market share. A conventional foldable mobile device typically utilizes a specific detection method to detect whether it is in an open position or a closed position, turning power on and off accordingly.

Two methods of detecting the position of a conventional foldable mobile device are described in the following. The first method utilizes magnetic switches, such as reed switches or HALL sensors. FIG. 1a shows a conventional foldable mobile phone utilizing a magnetic switch. FIG. 1b shows the magnetic switch in detail. A magnet 13 is set on a sub-body 11. A reed switch 14 is disposed on a main body 12. When the sub-body 11 approaches or separates from the main body 12, the distance between the magnet 13 and reed switch 14 changes such that the magnetic field detected by the reed switch 14 differs. Thus, the reed switch 14 is able to determine whether sub-body 11 is covering the main body 12 or not according to the magnetic field.

Another method utilizes a telescopic switch. FIG. 2a shows another conventional foldable mobile phone utilizing the telescopic switch. A protrusion 21 is disposed on the sub-body 11. The main body 12 has a recess 22. FIG. 2b shows a detailed diagram of the telescopic switch. The recess 22 has a telescopic switch 23. The protrusion 21 contacts the telescopic switch 23 as the sub-body 11 covers the main body 12. The telescopic switch 23, however, is not pressed if the sub-body 11 does not cover the main body 12. Thus, the position of the foldable mobile phone is determined according to the status of the telescopic switch 23.

Since a conventional foldable mobile device utilizes the magnetic switch 14 or the telescopic switch 23 to determine whether the sub-body covers the main body, the required space thereby and the manufacturing cost thereof are inevitably increased.

SUMMARY

An embodiment of the invention provides a detection method for a foldable electronic device comprising an first cover including a speaker and a second cover including a microphone. First, a specific sound wave is provided by the speaker. The specific sound wave has a first volume at a first frequency. The electronic device is then determined to be in an open or closed position according to a detected sound wave received by the microphone.

An embodiment of the invention additionally provides a foldable electronic device comprising an first cover, a second cover, and a processor. The first cover comprises a speaker for outputting a specific sound wave. The second cover comprises a microphone for receiving a detected sound wave. The first cover is rotatory mounted on the second cover. The processor determines whether the foldable electronic device is in an open or closed position according to the detected sound wave.

BRIEF DESCRIPTION OF THE DRAWINGS

Embodiments of the invention can be more fully understood by reading the subsequent detailed description and examples with reference made to the accompanying drawings, wherein.

DETAILED DESCRIPTION

A foldable mobile phone is given as an example of the electronic device. The foldable mobile phone of an embodiment of the invention comprises an first cover with a speaker and a second cover with a microphone, but is not limited to this.

Figure 1B:
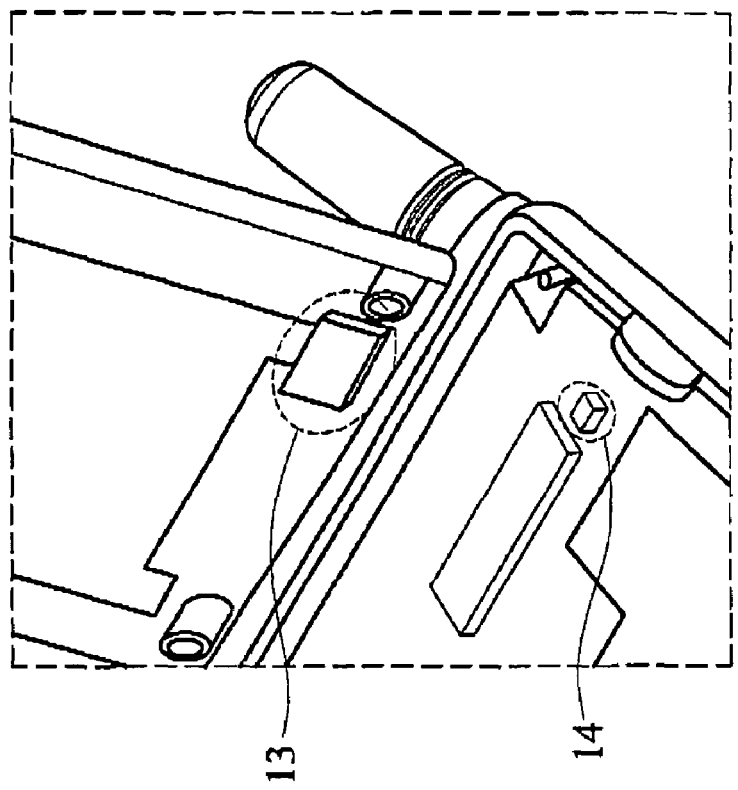
FIG. 1b shows the magnetic switch in detail.
Figure 1A:
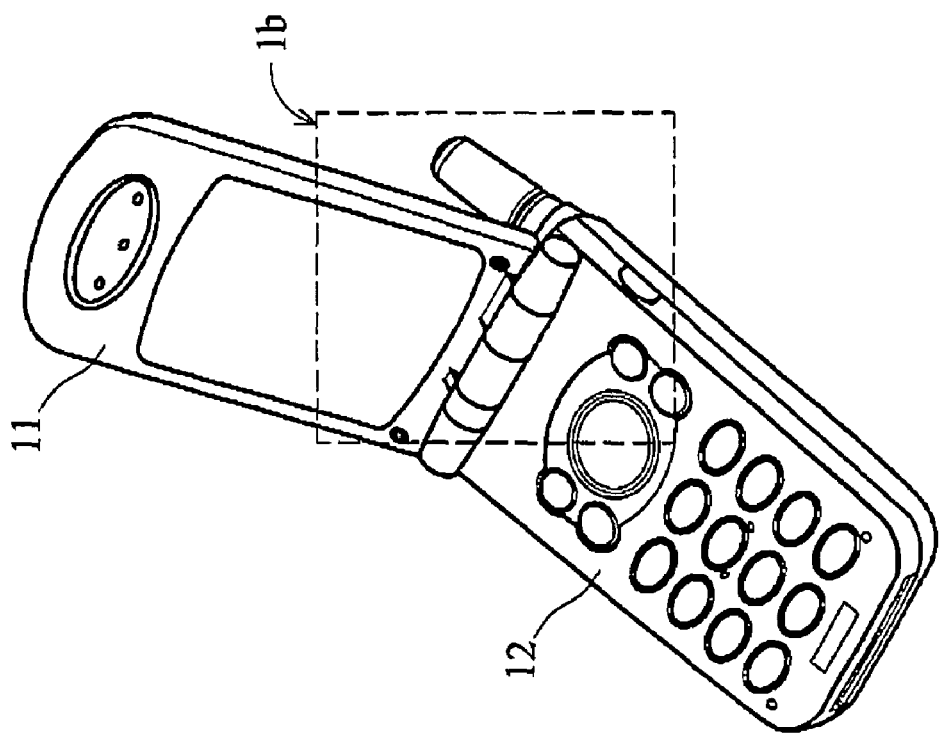
FIG. 1a shows a conventional foldable mobile phone utilizing the magnetic switch.
Figure 2B:
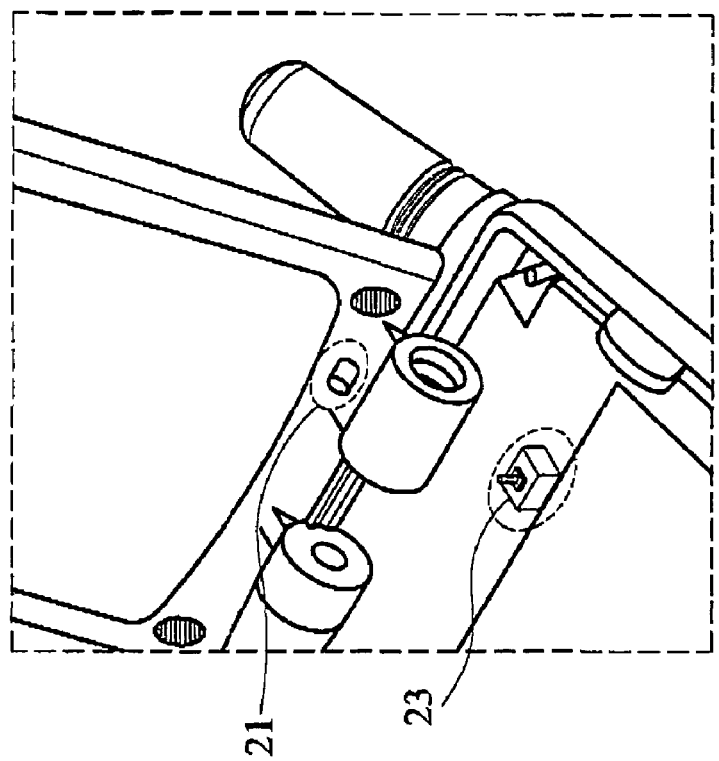
FIG. 2b shows a detailed diagram of the telescopic switch.
Figure 2A:
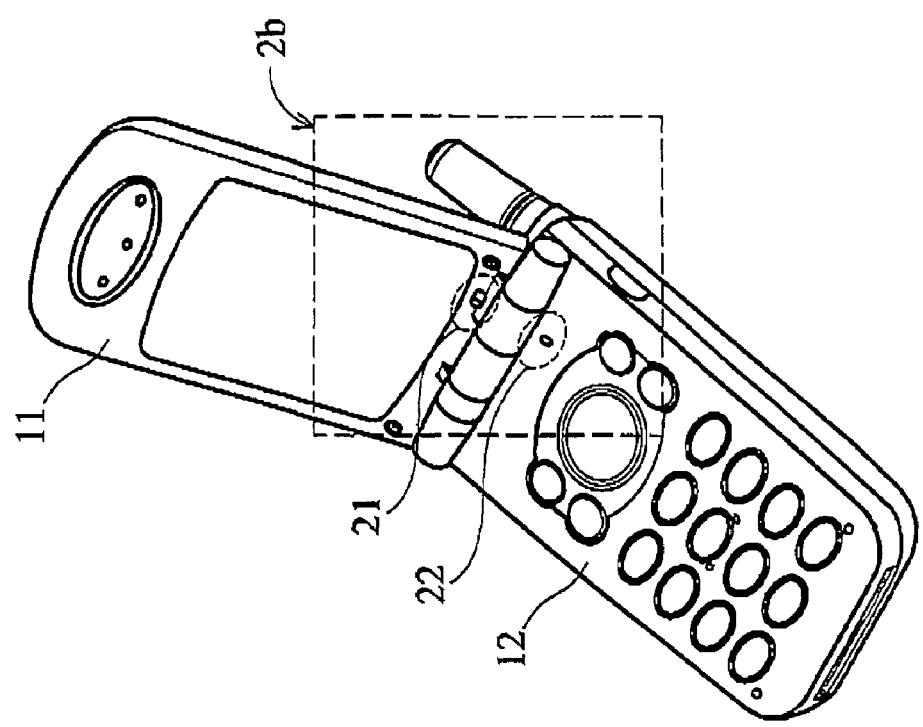
FIG. 2a shows another conventional foldable mobile phone utilizing the telescopic switch.
Figure 3:
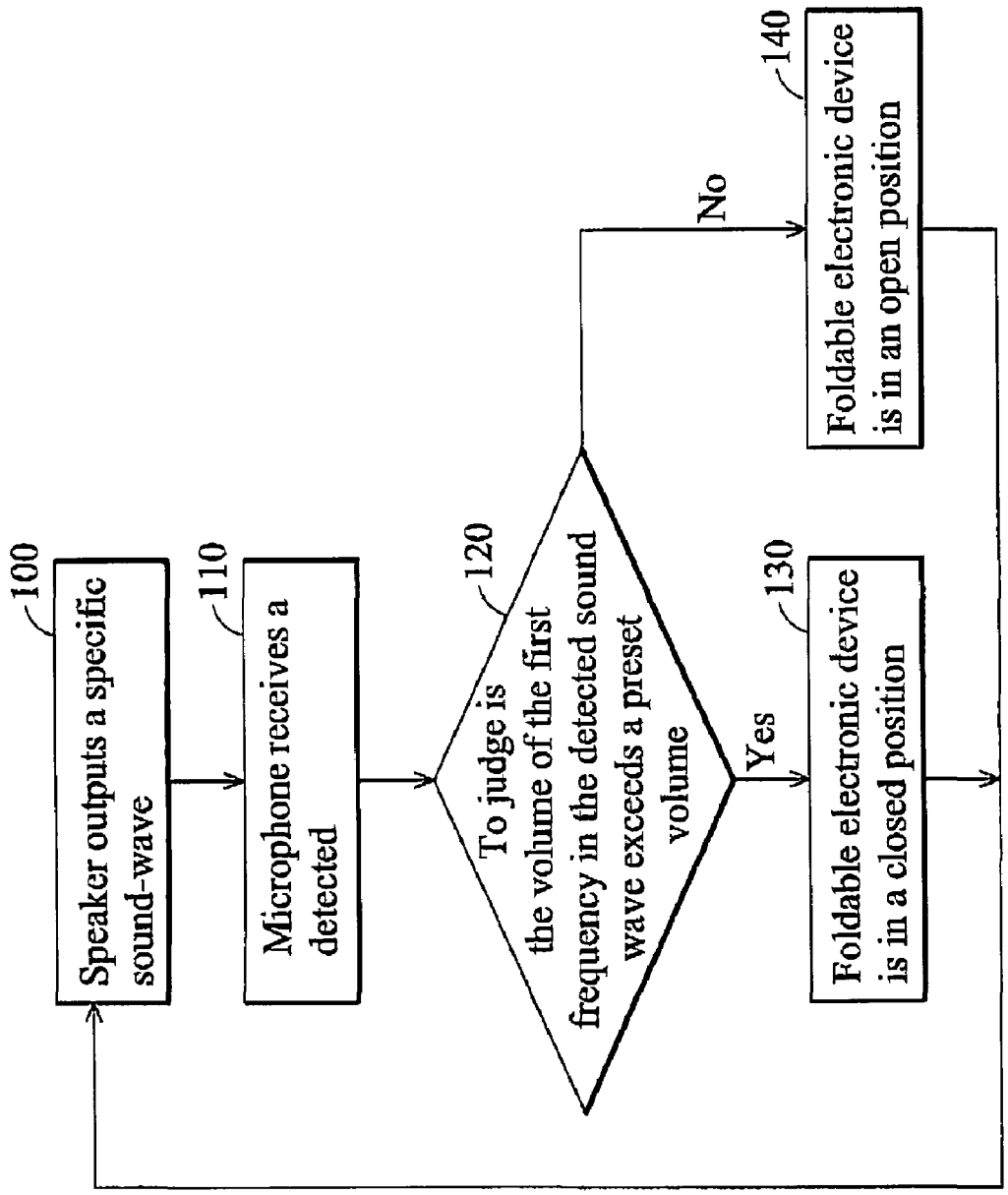
FIG. 3 is a flowchart of a detection method according to an embodiment of the invention.

FIG. 3 is a flowchart of a detection method according to an embodiment of the invention. First, a specific sound wave is output from the speaker in step 100. The specific sound wave is at a first frequency. Generally, frequency range of human hearing is from 20 Hz to 20 KHz. It is preferred that the first frequency is outside the frequency range of human hearing. An interrupt interval between every two emissions of the specific sound wave is provided to avoid excessive power consumption. That is, the specific sound wave is a periodically interrupted sound signal. Moreover, the specific sound wave can be a melody to increase discrimination.

A detected sound wave is received by the microphone in step 110. The volume of the first frequency of the detected sound wave must be greater than background noise. Typically, background noise is around 30 db, so that the detected volume is preferably around 40 db to 60 db. However, if the detected volume is too loud, the detection is less sensitive and the power loss is increased. When the detected volume approaches a minimum detectable volume of the microphone, the detection is more sensitive.

Each foldable electronic device may have a unique mechanical design. Since the distance between the first cover and the second cover in a foldable electronic device may be different with that of another foldable electronic device, a decline decibel may be generated. Therefore, the difference between the specific sound volume output from the speaker and the decline decibel should be detectable by the microphone. If the mechanism design of the foldable electronic device is well designed, the decline decibel approaches zero.

In step 120, determine if the specific sound wave is received (by the microphone) by detecting frequency and volume of the detected sound wave. Once the detected sound wave is at the first frequency, it is the specific sound wave. If the volume of the detected sound wave exceeds a preset volume, the foldable electronic device is determined to be in the closed position in step 130 and the process returns to step 100. If the volume of the detected sound wave is less than the preset volume, or the detected sound wave is not at the first frequency, then the foldable electronic device is determined to be in an open position in step 140 and the process returns to step 100.

If the preset volume equals the minimum detectable volume of the microphone, the sensitivity of the detection is optimal. The preset volume can be the detected volume received by the microphone when a foldable electronic device stays in a predetermined transitional position between the open and close positions.

If the foldable electronic device remains in one of the open or close positions, then the volume of the specific sound wave that the microphone receives stays unchanged, this means that variation value of the received volume is smaller than a preset variation value. In this state, there will be a first interrupt interval between every two emissions of the specific sound wave. At the moment the foldable electronic device changes its position, either from close position to open position or vice versa, the volume of the specific sound wave that the microphone receives changes, which means that variation value of the received volume is greater than the preset variation value. In this state, there will be a second interrupt interval between two emissions of the specific sound wave. More specifically, the first interrupt interval is greater than the second interrupt interval.

An alternative is that the first and second interrupt intervals are employed when the foldable electronic device is determined in open and close positions respectively. More often than not a foldable electronic device stays in stand-by and is in a close position. The close position, which has a higher possibility, needs not to be detected as frequently as the open position, which has a lower possibility. Otherwise, it may waste battery power to use the same interrupt interval in both open and close positions.

Figure 4A:
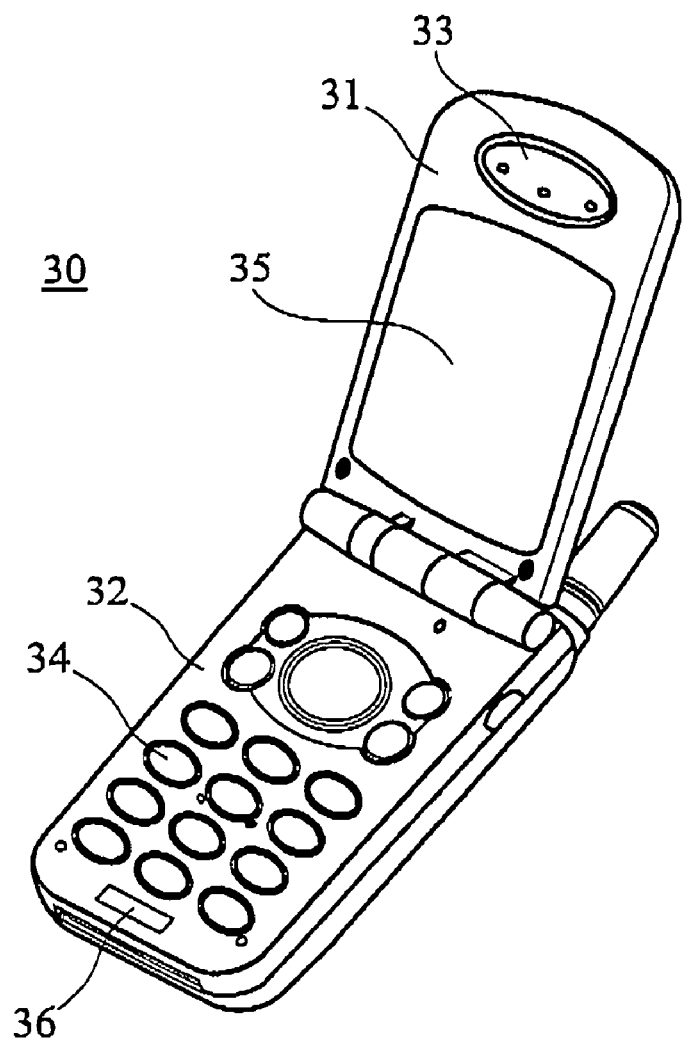
FIG. 4a is a schematic diagram of a foldable mobile phone according to an embodiment of the invention.

FIG. 4a is a schematic diagram of a foldable mobile phone according to an embodiment of the invention. The foldable mobile phone 30 is in an open position and comprises an upper-cover 31 and a lower-cover 32. The upper-cover 31 comprises a speaker 33 and a LCD module 35. The lower-cover 32 comprises a keypad 34 and a microphone 36. When the foldable mobile phone is in a closed position, the position of the speaker 33 is over the microphone 36.

Figure 4B:
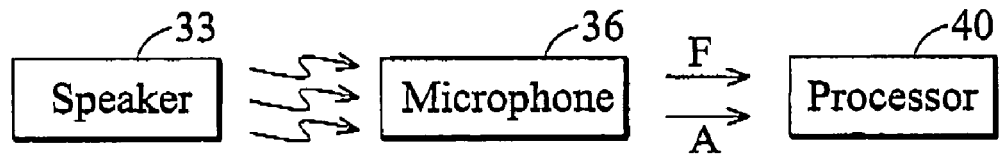
FIG. 4b is a block diagram of the foldable mobile phone according to an embodiment of the invention.

FIG. 4b is a block diagram of the foldable mobile phone according to an embodiment of the invention. The speaker 33 outputs a specific sound wave having a first volume at a first frequency. An interrupt interval between every two emissions of the specific sound wave is provided. Time period of the microphone 36 receiving a detection sound wave and time period of the speaker 33 outputting the specific sound wave should be overlapped.

A processor 40, such as an analog-digital converter (ADC) and a digital signal processor (DSP), determines the volume A and the frequency F of the detected sound wave received by the microphone 36. When the upper-cover 31 is very close to the lower-cover 32, the microphone easily detects whether the specific sound wave is received. If the processor 40 determines that the frequency F of the detected sound wave is at the first frequency and volume A exceeds a preset volume, the foldable mobile phone 30 is determined to be in the closed position.

When the upper-cover 31 goes away from the lower-cover 32, the volume A of the detected sound wave the microphone receives will decrease. If the processor 40 detects frequency F of the detected sound wave isn't at the first frequency or the volume A is less than the preset volume, the foldable mobile phone 30 is determined to be in the open position.

Embodiments of the invention utilize original elements to detect whether the foldable electronic device is in an open position. Thus, additional physical elements are not required and reduce cost and size.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for detecting folding status of a foldable electronic device, the device comprising a first cover with a speaker disposed therein and a second cover with a microphone disposed therein, the detection method comprising the steps of:
    generating a specific sound wave from the speaker, the specific sound wave having a first volume and a first frequency; and
    determining whether the electronic device is in an open position or a closed position according to a detected sound wave received by the microphone, wherein the speaker and the microphone are utilized by the foldable electronic device to achieve communication function.

2. The method as claimed in claim 1, wherein the first volume is approximately greater than or equal to a minimum volume detectable by the microphone.

3. The method as claimed in claim 2, wherein the detecting step further comprises:
    determining that the foldable electronic device is in the closed position when frequency of the detected sound wave is at the first frequency and the volume of the detected sound wave exceeds a preset volume;
    determining that the foldable electronic device is in the open position when frequency of the detected sound waved is at first frequency and the volume of the detected sound wave is less than the preset volume; and
    determining that the foldable electronic device is in the open position when the frequency of the detected sound wave is not at the first frequency.

4. The method as claimed in claim 1, wherein the first frequency is outside the frequency range of human hearing and the first volume is greater than a background noise level.

5. The method as claimed in claim 1, before the detecting step, further comprising:
    measuring the volume range that the microphone detects from the open position to the close position.

6. The method as claimed in claim 1, wherein the specific sound wave is a periodically interrupted sound signal.

7. The method as claimed in claim 1, wherein the specific sound wave has a first interrupt interval when the foldable electronic device is determined to be in the closed position, and wherein the specific sound wave has a second interrupt interval less than the first interrupt duration when the foldable electronic device is determined to be in the open position.

8. The method as claimed in claim 1, wherein the specific sound wave has a first interrupt interval when a variation value of the volume of the detected sound is smaller than a preset value, and the specific sound wave has a second interrupt interval less than the first interrupt duration when the variation value of the volume of the detected sound is higher than the preset value.

9. A foldable electronic device, comprising at least:
an first cover having a speaker for generating a specific sound wave,
a second cover having a microphone for receiving a detected sound wave, wherein the first cover is rotationally mounted on the second cover, wherein the speaker and the microphone are utilized by the foldable electronic device to achieve communication function; and
a processor determining whether the foldable electronic device is in an open position or a closed position according to the detected sound wave.

10. The foldable electronic device as claimed in claim 9, wherein the specific sound wave has a first volume and a first frequency outside the range of human hearing and detectable by the microphone.

11. The foldable electronic device as claimed in claim 10, wherein the first volume is approximately greater than or equal to a minimum volume detectable by the microphone.

12. The foldable electronic device as claimed in claim 11, wherein the processor determines that the foldable electronic device is in the closed position when frequency of the detected sound waved is at the first frequency and the volume of the detected sound wave exceeds a preset volume; that the foldable electronic device is in the open position when frequency of the detected sound waved is at the first frequency and the volume of the detected sound wave is less than the preset volume; and that the foldable electronic device is in the open position when the frequency of the detected sound wave is not at the first frequency.

13. The foldable electronic device as claimed in claim 9, wherein the processor further measures the volume range that the microphone detects from the open position to the close position.

14. The foldable electronic device as claimed in claim 9, wherein the specific sound wave is a periodically interrupted sound signal.

15. The foldable electronic device as claimed in claim 9, wherein the specific sound wave has a first interrupt interval when the foldable electronic device is determined to be in the closed position, and wherein the specific sound wave has a second interrupt interval less than the first interrupt duration when the foldable electronic device is determined to be in the open position.

16. The foldable electronic device as claimed in claim 9, wherein the specific sound wave has a first interrupt interval when a variation value of the volume of the detected sound is smaller than a preset value, and the specific sound wave has a second interrupt interval less than the first interrupt duration when the variation value of the volume of the detected sound is higher than the preset value.

17. A detection method for a foldable electronic device comprising a first cover with a speaker disposed therein and a second cover with a microphone disposed therein, the detection method comprising:
providing a specific sound wave by the speaker, wherein the specific sound wave has a first volume and a first frequency;
receiving a detected sound wave by the microphone and determining if frequency of the detected sound wave is at the first frequency, wherein the speaker and the microphone are utilized by the foldable electronic device to achieve communication function; and
detecting whether volume of the detected sound wave at the first frequency exceeds a preset volume for determining that the electronic device is in an open position or a closed position.

18. The detection method as claimed in claim 17, wherein the first volume is approximately greater than or equal to a minimum detectable by the microphone, and the preset volume is the minimum detectable by the microphone.

19. The detection method as claimed in claim 17, wherein the detecting step further comprises:
determining that the electronic device is in the closed position when frequency of the detected sound wave is at the first frequency and the volume of the first frequency of the detected sound wave exceeds the preset volume; and
determining that the electronic device is in the open position when frequency of the detected sound wave is at the first frequency and the volume of the detected sound wave is less than the preset volume.

20. The detection method as claimed in claim 17, wherein the first frequency is outside the frequency range of human hearing and the first volume is greater than a background noise level.

21. The detection method as claimed in claim 17, wherein the preset volume is a detected volume received by the microphone when the foldable electronic device stays in a predetermined transitional position between the open and close positions.

* * * * *